US012477012B1

(12) United States Patent
Hansen et al.

(10) Patent No.: US 12,477,012 B1
(45) Date of Patent: Nov. 18, 2025

(54) SYSTEMS AND METHODS FOR BLOCKCHAIN-BASED CONTROL OF NOTIFICATION PERMISSIONS

(71) Applicant: Permissionize LLC, Boulder, CO (US)

(72) Inventors: Shannon Hansen, San Diego, CA (US); Thomas Cutshall, Boulder, CO (US)

(73) Assignee: Permissionize LLC, Boulder, CO (US)

( * ) Notice: Subject to any disclaimer, the term of this patent is extended or adjusted under 35 U.S.C. 154(b) by 340 days.

(21) Appl. No.: 17/714,080

(22) Filed: Apr. 5, 2022

(51) Int. Cl.
*H04L 9/40* (2022.01)

(52) U.S. Cl.
CPC .................................. *H04L 63/205* (2013.01)

(58) Field of Classification Search
CPC ..................................................... H04L 63/205
See application file for complete search history.

(56) References Cited

U.S. PATENT DOCUMENTS

| | | | | |
|---|---|---|---|---|
| 6,996,718 | B1 * | 2/2006 | Henry ..................... | G06F 21/41 713/184 |
| 11,115,401 | B2 * | 9/2021 | Ford ................... | H04L 63/0421 |
| 2002/0112155 | A1 * | 8/2002 | Martherus ............. | H04L 63/083 713/155 |
| 2008/0256609 | A1 * | 10/2008 | Bodepudi ............... | G06F 21/41 726/4 |
| 2012/0063594 | A1 * | 3/2012 | Spalka .................. | H04L 9/0816 380/44 |
| 2015/0088612 | A1 * | 3/2015 | Palan ................. | G06Q 30/0205 705/7.29 |
| 2017/0364956 | A1 * | 12/2017 | Dhar ..................... | H04L 63/102 |
| 2019/0156000 | A1 * | 5/2019 | Hoffmann ............. | H04L 9/3226 |
| 2019/0163896 | A1 * | 5/2019 | Balaraman ............. | G06F 21/41 |
| 2021/0149899 | A1 * | 5/2021 | Gutiérrez .............. | G06F 16/252 |
| 2021/0218742 | A1 * | 7/2021 | Cook ..................... | G06F 21/31 |
| 2021/0400487 | A1 * | 12/2021 | Frank .................... | H04W 12/08 |
| 2022/0150323 | A1 * | 5/2022 | Aluvala ............... | H04L 67/306 |
| 2023/0028555 | A1 * | 1/2023 | Cameron ........... | H04L 63/0876 |

* cited by examiner

*Primary Examiner* — Carl G Colin
*Assistant Examiner* — Andrew Suh
(74) *Attorney, Agent, or Firm* — Esplin & Associates, PC

(57) ABSTRACT

Systems and methods to provide control of notification permissions are disclosed. Exemplary implementations may receive user-specific instructions to modify notification permissions for users; encrypt the user-specific instructions into user-specific sets of information; create a multi-user set of information by encrypting a combination of multiple user-specific sets of information; record the multi-user set of information on a permanent registry; receive a notification instruction to verify whether notifying a particular user on behalf of a particular organization is permitted; retrieve user-specific information for the particular user; determine whether notifying the particular user is permitted; and/or recommend or take action based on the determination.

14 Claims, 4 Drawing Sheets

SYSTEMS AND METHODS FOR BLOCKCHAIN-BASED CONTROL OF NOTIFICATION PERMISSIONS

FIELD OF THE DISCLOSURE

The present disclosure relates to systems and methods to provide control of notification permissions, based on information recorded on permanent registries.

BACKGROUND

People giving permission to be notified or contacted is known. Notifying people without having their permission to do so is also known, and generally not appreciated. Distributed and/or permanent registries are known techniques to produce a secure record or registry of events, transactions, and other information.

SUMMARY

One aspect of the present disclosure relates to a system configured to provide control of notification permissions. The system may include a permission server, electronic storage, one or more (hardware) processors configured by machine-readable instructions, a registry server, and/or other components. The system may receive user-specific instructions to modify notification permissions for users; encrypt the user-specific instructions into user-specific sets of information; create a multi-user set of information by encrypting a combination of multiple user-specific sets of information; record the multi-user set of information on a permanent registry; receive a notification instruction to verify whether notifying a particular user on behalf of a particular organization is permitted; retrieve user-specific information for the particular user; determine whether notifying the particular user is permitted; and/or recommend and/or take action based on the determination.

Another aspect of the present disclosure related to a method of providing control of notification permissions. The method may include receiving user-specific instructions to modify notification permissions for users. The method may include encrypting the user-specific instructions into user-specific sets of information. The method may include creating a multi-user set of information by encrypting a combination of multiple user-specific sets of information. The method may include recording the multi-user set of information on a permanent registry. The method may include receiving a notification instruction to verify whether notifying a particular user on behalf of a particular organization is permitted. The method may include retrieving user-specific information for the particular user. The method may include determining whether notifying the particular user is permitted. The method may include recommending and/or taking action based on the determination.

As used herein, any association (or relation, or reflection, or indication, or correspondency, or correlation) involving servers, processors, client computing platforms, users, instructions, permissions, identifiers, notifications, sets of information, determinations, distributions, transfers, presentations, interfaces, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
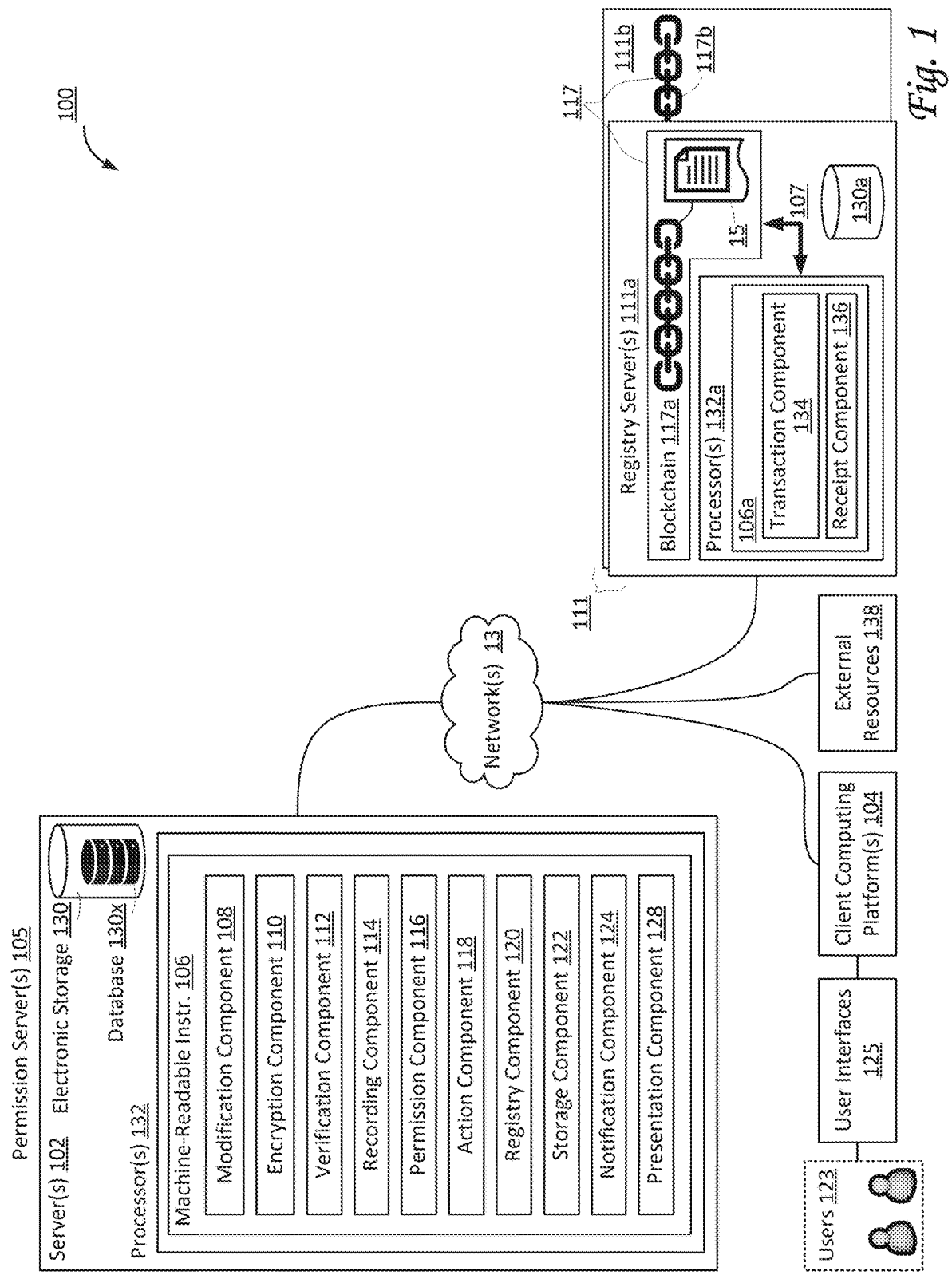
FIG. 1 illustrates a system configured to provide control of notification permissions, in accordance with one or more implementations.

FIG. 1 illustrates a system 100 configured to provide control of notification permissions, in accordance with one or more implementations. As a preliminary and non-limiting example, by virtue of the systems and methods described in this disclosure, people and organizations can control their notification permissions. For example, a benefit for a particular user may be to control who can contact the particular user. For example, a benefit for a particular organization may be to verify whether a particular user has permitted the particular organization to notify the particular user, either prior to or after such a notification. Events, transactions, and/or other information pertaining to notification permissions may be securely, permanently, and/or transparently recorded and/or otherwise registered on one or more permanent registries 117, as well as on electronic storage.

System 100 may include one or more permission servers 105, registry server(s) 111, client computing platform(s) 104, user interface(s) 125, server(s) 102, external resource(s) 138, and/or other components. Users 123 (also referred to as users) may include one or more of a first user, a second user, a third user, a fourth user, and/or other users.

Users 123 may include users who use permission server 105, directly or indirectly. As used in descriptions herein, any use of the term "user" may refer to user(s) 123, unless indicated otherwise.

Registry server(s) 111 (e.g., registry server 111a, registry server 111b, and so forth) may be used to implement one or more permanent registries 117, including but not limited to blockchain 117a, blockchain 117b (partially visible in FIG. 1), and so forth. In some implementations, one or more permanent registries 117 may be decentralized and/or immutable registries (i.e., such a registry is append-only since previously added records are immutable). In some implementations, blockchain 117a and blockchain 117b may be maintained by distributed computing platforms (not shown in FIG. 1). In some implementations, a distributed computing platform may be implemented by a set of client computing platforms and/or servers (including, for example, one or more registry servers 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of blockchain 117a. For example, the smart contracts may be stored on blockchain 117a, blockchain 117b, and/or another permanent registry. In some implementations, the distributed computing platform may be the EOSIO platform. In some implementations, the distributed computing platform may be similar to or based on the EOSIO platform. In some implementations, the distributed computing platform may be ETHEREUM. In some implementations, the distributed computing platform may be similar to or based on ETHEREUM. In some implementations, the distributed computing platform may be the POLYGON platform. In some implementations, the distributed computing platform may be similar to or based on the POLYGON platform. In some implementations, the virtual machine may be a distributed and/or decentralized virtual machine.

In some implementations, at least one of permanent registries 117 implemented by registry servers 111 is a private permissioned permanent registry (e.g., a private permissioned blockchain). The private permissioned permanent registry may be configured to record information. The recorded information may include information pertaining to notification permissions. In some implementations, at least one of permanent registries 117 implemented by registry servers 111 is a public permanent registry (e.g., a public blockchain). The public permanent registry may be configured to be part of either EOSIO mainnet, ETHEREUM mainnet, ETHEREUM 1.5, ETHEREUM 2.0, a derivative of ETHEREUM 2.0 that is configured to perform transactions of Ether (ETH) between accounts, or a derivative of EOSIO that is configured to perform transactions of EOS between different accounts.

Elements of blockchain 117a or another permanent registry may be grouped together in units that are referred to as blocks. For example, a particular individual block may include one or more sets of information, one or more transactions, and/or other contents. For example, an individual block may be linked to one or more other individual blocks. Individual blocks may be linked or chained together to form a structure of blocks and/or a hierarchy of blocks, such as, e.g., a chain of blocks. An individual block may include one or more digital articles, one or more transactions, smart contracts, and/or other information.

In some implementations, one or more permanent registries 117 implemented by registry servers 111 may be publicly accessible. In some implementations, one or more permanent registries 117 implemented by registry servers 111 may be private and/or permissioned. In some implementations, one or more permanent registries 117 implemented by registry servers 111 may be append-only (such that existing blocks are immutable once they have been added to the registry, and modifications are made by newly-added transactions). In some implementations, existing blocks of one or more permanent registries 117 implemented by registry servers 111 can substantially not be altered or deleted, unless multiple copies are altered. This is unlikely to happen provided that the multiple copies are stored on different computing platforms, e.g., in different geographical locations. Permanent registries 117 may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or articles may be digitally signed in a manner that proves integrity and/or prevents tampering, e.g., by providing authentication, as well as non-repudiation.

As depicted in FIG. 1, registry server 111a may include one or more of electronic storage 130a, a set of processors 132a, machine-readable instructions 106a, (node of) blockchain 117a, and/or other components. Machine-readable instructions 106a may include one or more instruction components. The instruction components may include computer program components. The instruction components may include one or more of a transaction component 134, a receipt component 136, and/or other instruction components. In some implementations, an individual registry server may be dedicated to a particular node of a permanent registry. Typically, different nodes are included in (or implemented by, or hosted by) different servers or different computer systems to increase the safety and security of transactions on a blockchain. The consensus protocol used for a particular blockchain will be harder to falsify or circumvent when the different nodes are in different geographical locations, on different types of computing platforms, controlled by different organizations or people, and/or otherwise distributed and diverse. As depicted in FIG. 1, blockchain 117a may include a set of information 15 (by way of non-limiting example, set of information 15 may have been created by encryption, compression, and/or other data-processing techniques). Registry server 111b may include similar components as registry server 111a, including but not limited to blockchain 117b and/or other components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, system 100 and/or registry server(s) 111 may be configured to communicate with one or more of permission server(s) 105, users 123, and/or other entities and/or components, e.g., through one or more networks 13.

Server(s) 102 may include electronic storage 130, (hardware) processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a modification component 108, an encryption component 110, a verification component 112, a recording component 114, a permission component 116, an action component 118, a registry component 120, a storage component 122, a notification component 124, a presentation component 128, transaction component 134, receipt component 136, and/or other instruction components. Processor(s) 132*a* may be similar to processor(s) 132 as described elsewhere in this disclosure, though included in registry servers 111, as depicted in FIG. 1. Machine-readable instructions 106*a* may be similar to machine-readable instructions 106 as described elsewhere in this disclosure, though included in registry servers 111, as depicted in FIG. 1.

Modification component 108 may be configured to receive instructions and/or requests pertaining to permissions, including but not limited to notification permissions, usage permissions, and/or other permissions. For example, a particular instruction may be to add (a.k.a. grant) a notification permission for a particular user. For example, a particular instruction may be to modify or change a notification permission for a particular user. For example, a particular instruction may be to delete (a.k.a. revoke) a notification permission for a particular user. As used herein, the term "modify" may be used to cover additions, deletions, and/or modifications of existing notification permissions. In some implementations, modification component 108 may receive user-specific instructions to modify one or more user-specific notification permissions. Received instructions and/or requests may include one or more user identifiers, one or more organization identifiers, and/or other information. Modification component 108 may be configured to modify notification permissions in accordance with received instructions and/or requests.

User identifiers may identify users, such as, e.g., a name, tag, handle, or alias. In some implementations, the user identifiers may include a particular user identifier through which a particular user can receive notifications. For example, such a particular user identifier could include one or more of a phone number, an email address, a user account address, a social security number (SSN), a (residential) home address, a mailing address, an internet protocol (IP) address, a media access control (MAC) address, and/or other information that can be used (in some cases indirectly, by using a suitable database that connects this information to a person) to contact the particular user.

Organization identifiers may identify organizations, including but not limited to corporations, charities, communities, non-profit organizations, and/or other organizations. For example, a particular set of organization identifiers may identify a corresponding set of organizations for which a particular user-specific instruction is received by modification component 108. For example, the particular user-specific instruction may modify one or more notification permissions for the particular user (pertaining to the particular set of organization identifiers). For example, this particular user-specific instruction may allow the organizations in the particular set of organizations (say, organizations "A", "B", and "C") to notify the particular user.

In some implementations, instructions received by modification component 108 may include timing information, such as, e.g., a timestamp. In some implementations, instructions received by modification component 108 may include information and/or attributes regarding the origin or source through which one or more users initiated a modification in notification permissions, such as, e.g., an IP address, an originating website or online service or external web-server hosting a particular website, and/or other information. By way of non-limiting example, such information may be related to the particular set of organizations previously described (say, organizations "A", "B", and "C"). For example, the origin or source may be a website for organization "A", a web-server for organization "B", an online service (e.g., organization-specific application software) for organization "C", and so forth. In some cases, individual instructions and/or requests received by modification component 108 may be referred to as events. Information pertaining to individual events may be stored, e.g., in electronic storage 130, including but not limited to a database 130*x*.

In some implementations, users may agree to be notified by, e.g., organization "A" through a (web-based) form or through a selection made on the website for organization "A". The server for this website (which may be external to system 100 and, e.g., considered part of external resources 138) may be configured to transfer user-specific instructions to modify notification permissions to system 100 (and more specifically, to modification component 108).

Figure 3A:
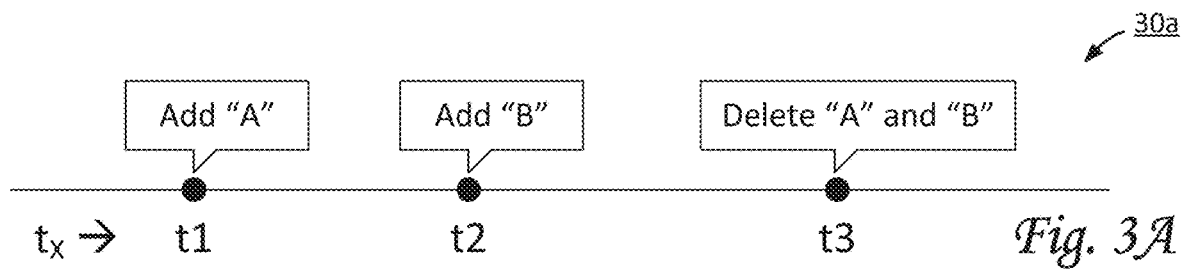
FIGS. 3A-3B-3C illustrate examples of timelines, as may be used by a system configured to provide control of notification permissions, in accordance with one or more implementations.

Information regarding notification permissions may be stored, e.g., in electronic storage 130 and/or in other types of storage. In some implementations, storage component 122 may be configured to store information in electronic storage, including but not limited to electronic storage 130. For example, notification permissions may be organized in database 130*x* for future access. Database 130*x* (which may, for example, be part of electronic storage 130) may be queried for the current status of a particular user's notification permissions. In some cases, database 130*x* may be queried (by way of non-limiting example, by permission component 116) for an overview of all known changes to the notification permissions for a particular user. For example, individual modifications may be linked in database 130*x* to individual events. In some cases, this overview may be referred to as a timeline. By way of non-limiting example, FIG. 3A illustrates a particular timeline 30*a* (with time "t" being specific for user "X" as indicated by the notation of "tx"). This timeline shows user "X" allowed organization "A" on time "t1" to notify user "X" henceforth (and this modification of the notification permissions for user "X" may be linked to a first particular event, i.e., a particular instruction received by modification component 108). Furthermore, particular timeline 30*a* may show this same user allowed organization "B" on time "t2" to notify user "X" henceforth (and this modification of the notification permissions for user "X" may be linked to a second particular event, i.e., a second particular instruction received by modification component 108). Finally, particular timeline 30*a* may show this same user modified the notification permissions on time "t3" to no longer allow either organization "A" or organization "B" to contact user "X" any more (and this modification of the notification permissions for user "X" may be linked to a third particular event, i.e., a third particular instruction received by modification component 108). Note that "t1" precedes "t2", which precedes "t3". In some cases, timelines may be specific for not just a user, but a user-specific user identifier. For example, a particular user's email address may correspond to one timeline, and the same user's phone number may correspond to another timeline. In some implementations, individual timelines may be stored in (or retrievable from) database 130*x* in electronic storage 130. In some cases, information that identifies individual events in individual timelines may be stored in and retrievable from database 130*x*. In some implementations, individual timelines may be created, constructed, and/or reconstructed by permission component 116 based on information retrieved from database 130*x* and blockchain 117*a*.

Encryption component 110 may be configured to encrypt information. In some implementations, encryption component 110 may encrypt user-specific information. In some implementations, encryption component 110 may encrypt a set of information pertaining to multiple users (e.g., a set of users). For example, encryption component 110 may encrypt a particular user-specific instruction (e.g., as received by modification component 108) into a particular user-specific set of information. In some implementations, encryption component 110 may use a (cryptographic) hashing function to encrypt information. For example, a particular user-specific instruction may be hashed using a fixed-output-length hashing function into a fixed-output-length output (i.e., a bit sequence or bit array). Common output lengths for the hash functions mentioned in this disclosure (and their variants) are 128, 256, and 512 bits. Hashing is typically one-way, so that the input cannot be retrieved from the output, though third parties could verify that particular input into a particular hashing function would produce particular output. The particular user-specific set of information created through the hashing function may also be referred to as an event hash (i.e., the hash for a single event).

Operations by encryption component 110 may be performed repeatedly for different users, such as a first time for a first user (creating a first set of user-specific information), a second time for a second user (creating a second set of user-specific information), a third time for a third user (creating a third set of user-specific information), and so forth. In some cases, system 100 may process 100s, 1000s, hundreds of thousands, or millions of instances of user-specific information (or event hashes) daily. Encryption component 110 may be configured to encrypt a combination of information from multiple users (e.g., from 100s, 1000s, hundreds of thousands, or millions of users). Specifically, encryption component 110 may create a multi-user set of information by encrypting multiple user-specific sets of information. This multi-user set of information may be referred to as a "master hash". For example, a particular multi-user set of information may include the first set of user-specific information, the second set of user-specific information, and so forth. By virtue of using a fixed-length-output hashing function, the resulting output would be the same size regardless of whether the combination combines 100s or 1000s of sets of information (or event hashes) as input. To allow third-party verification, the set of event hashes for a particular master hash may be published and/or otherwise posted publicly (e.g., on a publicly accessible server that is considered part of external resources 138), so that anyone can verify that creating a master hash based on this particular set of event hashes as input indeed produces the specific value recorded on one or more permanent registries 117.

The multi-user set of information may effectively be a hash of hashes, or, more specifically, a single master hash of many event hashes. In some implementations, different multi-user sets of information may be created by encryption component 110 periodically (e.g., daily, or every few days, or whenever at least a predetermined number of user-specific sets of information have been produced by encryption component 110 that have not yet been combined into any multi-user set of information). In some implementations, encryption component 110 may produce a sequence of multi-user sets of information, e.g., at a rate matching a predetermined period. In some implementations, a particular multi-user set of information may include a link, reference, and/or other specific information pertaining to the previous multi-user set of information in this sequence. In some implementations, a particular multi-user set of information may be combined with a link, reference, and/or other specific information pertaining to the previous multi-user set of information in this sequence, e.g., to record this particular multi-user set of information on one or more permanent registries 117. In some cases, this link or reference may be hashed as well.

In some implementations, the combination of sets of user-specific information that is used as input to create a particular multi-user set of information may be publicly available (e.g., may be posted) such that third parties can verify that this particular combination indeed produces this particular multi-user set of information.

Verification component 112 may be configured to receive instructions and/or requests pertaining to verifications. For example, verification component 112 may receive a notification instruction to verify whether a particular notification is permitted, based on pertinent notification permissions. Such a notification instruction may be received from an initiator (i.e., a party or device external to permission serv 105, including but not limited to external web-servers and/or other third parties). The particular notification may be to notify a particular user on behalf of one or more particular organizations. These one or more particular organizations may be identified by one or more organization identifiers. These one or more particular organization identifiers may be included in the notification instruction. In some cases, instructions received by verification component 112 may be interpreted as requests for verification. In some cases, verifications as requested to verification component 112 are based on current notification permissions. Verifications based on current notification permissions may be performed in real-time. In other words, verifications may be based on the latest available information (e.g., stored in electronic storage 130) regarding the notification permissions for a specific user. In other cases, verifications as requested to verification component 112 may be based on the notification permissions at some specific point in time in the past. This specific point in time may be referred to as an audit point. In some implementations, instructions and/or requests received by verification component 112 may including timing information, including but not limited to one or more timestamps. In some cases, such a timestamp may be referred to as an audit point. In some implementations, the verifications as instructed and/or requested may be performed by permission component 116.

In some implementations, verification component 112 may be configured to respond to received instructions and/or requests in real-time. As used herein, a real-time response may be defined as a response that occurs within a predetermined period from the receipt of the pertinent instruction and/or request. In some cases, the predetermined period is 1 second. In some cases, the predetermined period is 10 seconds. In some cases, the predetermined period is 1 minute. In some cases, the predetermined period ranges between 1 and 10 seconds, between 2 and 20 seconds, between 3 and 30 seconds, and/or between other durations.

Referring to FIG. 1, recording component 114 is configured to record events, transactions, and/or other information on permanent registries 117. In some implementations, the information may include executable code, such as, e.g., smart contracts. In some implementations, recording component 114 may record and/or modify rights pertaining to digital articles. In some implementations, recording component 114 may be configured to receive (recordation) instructions to perform a recordation (e.g., of a master hash or a smart contract on a permanent registry). For example, recording component 114 may receive, from a first user, a recordation instruction to record a first master hash on a first permanent registry (such as, e.g., blockchain 117a). In some implementations, recording component 114 may receive such instructions from permission server 105 and/or other components of system 100. For example, a particular instruction to record information may correspond to the creation and/or production of a particular master hash by encryption component 110. In some implementations, recording component 114 may be configured to record executable code on a particular permanent registry, such as, e.g., blockchain 117a. In some implementations, particular executable code may be a particular smart contract. The particular smart contract may be configured to perform one or more evaluations, e.g., based on real-world information or events.

Permission component 116 may be configured to make determinations and/or verifications regarding notifications. For example, permission component 116 may make determinations and/or verifications based on received instructions and/or requests by verification component 112. In some implementations, the determinations and/or verifications are specific to a particular user. For example, permission component 116 may determine that notifying a first user on behalf of a first organization is permitted based on the current notification permissions for the first user. For example, permission component 116 may determine that notifying a second user on behalf of a second organization is not permitted based on the current notification permissions for the second user, and so forth. In some implementations, the determinations and/or verifications are based on user-specific information. For example, the user-specific information may be retrieved by storage component 122. In some cases, the user-specific information may be retrieved from database 130x and/or electronic storage 130. Alternatively, and/or in the same case, the user specific information may be retrieved from one or more permanent registries 117, e.g., blockchain 117a. Permission component 116 may be configured to determine and/or verify whether a particular notification is permitted, based on pertinent notification permissions. The particular notification may be user-specific. The particular notification may be specific to one or more organizations. The particular notification may be related to a particular moment in time, such as, e.g., an audit point. In some cases, the result of a determination by permission component 116 may simply be pass or fail, or, in other words, "yes" or "no". In other cases, the result may include a subset of user identifiers (i.e., those specific users for which a particular notification on behalf of one or more specific organizations is permitted). In other cases, the result may include a subset of organization identifiers (i.e., those specific organizations for which a particular notification to one or more specific users is permitted). In some cases, the result of a determination or verification by permission component 116 may be to allow/permit or block/deny a particular phone call, or web-access, or presentation of particular information through a website.

Figure 3B:
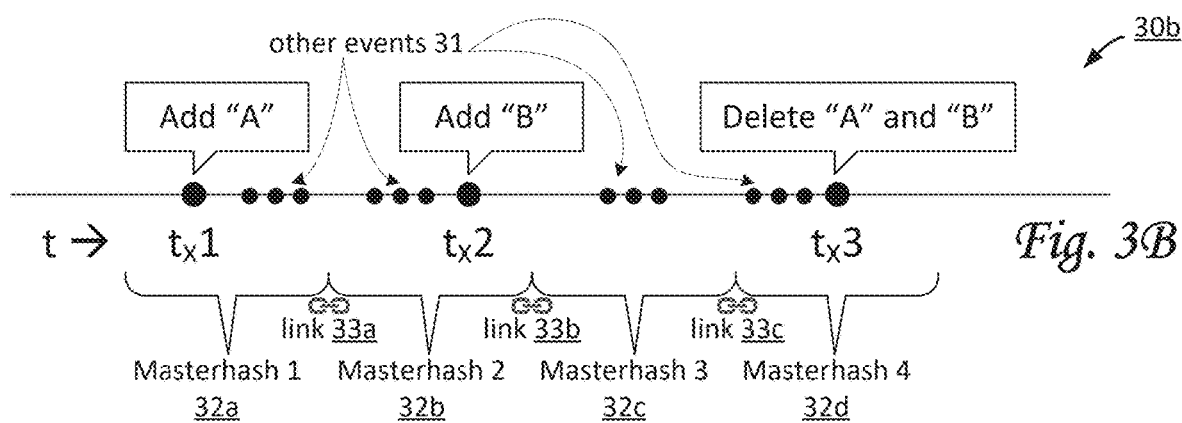

In some implementations, permission component 116 may be configured to construct and/or reconstruct a timeline for a particular user, of modifications to the notification permissions of the particular user. In some implementations, permission component 116 may be configured to construct and/or reconstruct a timeline for a particular user, of modifications to the notification permissions for a particular user identifier that identifies the particular user. Based on information retrieved from electronic storage 130 (e.g., database 130x) and one or more permanent registries 117 (e.g., blockchain 117a), permission component 116 may construct an overview in time including events that modify notification permissions pertaining to the particular user. In some cases, individual events may be linked to the pertinent master hashes that are based in part on the particular set of information as encrypted by encryption component 110. By way of non-limiting example, FIG. 3B illustrates a particular timeline 30b as may be reconstructed for a particular user "X". Based on retrieved information, reconstructed timeline 30b will include the same three events as shown in FIG. 3A, here labeled "tx1", "tx2", and "tx3". Additionally, timeline 30b illustrates how these events, together with other events 31 are grouped together in mutually exclusive periods that correspond to a sequence of individual master hashes, referred to here as a first master hash 32a, a second master hash 32b, a third master hash 32c, and a fourth master hash 32d. As shown, the first event "tx1" was combined, with certain other events 31, into first master hash 32a, the second event "tx2" was combined, with certain other events 31, into second master hash 32b, and the third event "tx3" was combined, with certain other events 31, into fourth master hash 32d. The sequence of individual master hashes are linked to each other as shown, with fourth master hash 32d linking via link 33c, to third master hash 32c, which is in turn linked via link 33b to second master hash 32b, which is in turn linked via link 33a to first master hash 32a. As shown, third master hash 32c does not include events for user "X".

Figure 3C:
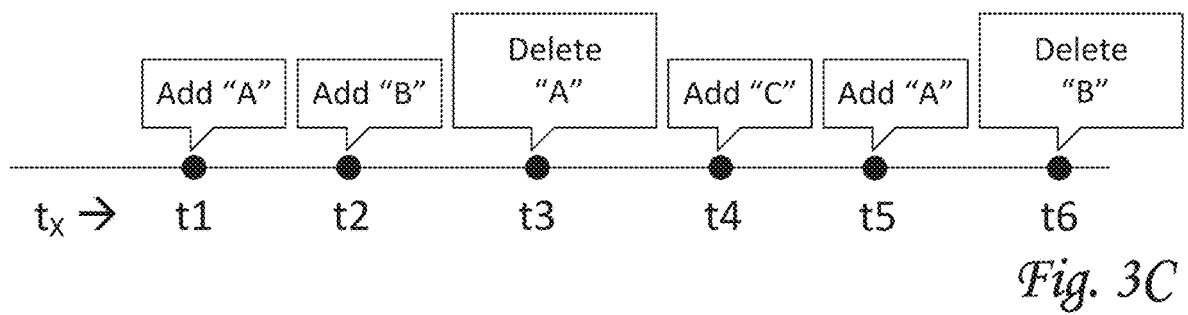

By way of non-limiting example, FIG. 3C illustrates a particular timeline 30c (with time "t" being specific for a user "X" as indicated by the notation of "$t_x$"). This timeline shows six separate events, at times "t1"-"t6". At each event, one of the organizations "A", "B", and "C" is either added or deleted/removed from the notification permissions for user "X". Accordingly, audit points can fall in seven categories: before "t1", between "t(n)" and "t(n−1)" for "n" in [2 . . . 6], and after "t6". For example, notifications to user "X" on behalf of organization "A" are not permitted between "t3" and "t5", and notifications to user "X" on behalf of organization "C" are not permitted before "t4", but allowed after "t4", based on timeline 30c.

Referring to FIG. 1, action component 118 may be configured to control actions based on determinations and/or verifications by permission component 116 and/or other components of system 100. In some implementations, the actions may include a transfer of a response, a result, a reconstructed timeline, and/or other information to the initiator of the pertinent notification instruction. In some cases, action component 118 make recommend or take actions based on the result of a determination by permission component 116, e.g., to allow/permit or block/deny a particular phone call, or web-access, or presentation of particular information through a website. In some implementations, the actions may include notifications.

Registry component 120 may be configured to generate sets of instructions for registry servers 111 (e.g., registry server 111a) and/or one or more permanent registries 117 (e.g., blockchain 117a). In some implementations, registry component 120 may be configured to transfer the generated sets of instructions to registry servers 111 and/or one or more permanent registries 117. In some implementations, one or more of these instructions may instruct the recording of a multi-user set of information (i.e., a master hash) on one or more permanent registries 117 (e.g., blockchain 117a). In some implementations, one or more of these instructions may instruct the formation of a smart contract and/or the recording of the smart contract on one or more permanent registries 117 (e.g., blockchain 117a). In some implementations, one or more of these instructions may call and/or otherwise invoke a method or function of a smart contract on one or more permanent registries 117 (e.g., blockchain 117a). In some implementations, these instructions may instruct registry servers 111 to record and/or modify information on one or more permanent registries 117, or to analyze ownership as recorded on one or more permanent registries 117.

Storage component 122 may be configured to store information in electronic storage, including but not limited to electronic storage 130 and/or database 130x. Storage component 122 may be configured to retrieve and/or otherwise obtain stored information from electronic storage, including but not limited to electronic storage 130 and/or database 130x. For example, stored information may include notification permissions (e.g., as modified by modification component 108). For example, retrieved information may include user-specific information. In some implementations, storage component 122 may be configured to store and/or retrieve information from one or more permanent registries 117.

Notification component 124 may be configured to notify users and/or third parties. For example, notification component 124 may notify a third party based on a notification instruction. In some implementations, actions by notification component 124 may be performed responsive to particular actions, results, determinations, and/or decisions from other components of system 100.

Presentation component 128 may be configured to present interfaces (e.g., user interfaces 125) to users, e.g., through client computing platforms 104 associated with the respective users. In some implementations, presentation component 128 may be configured to effectuate presentations of interfaces to users 123.

Receipt component 136 may be configured to receive (sets of) instructions to add, modify, analyze, and/or remove recorded information in blockchain 117a. For example, receipt component 136 may receive one or more sets of instructions from registry component 120, permission server 105, and/or other components of system 100. Receipt component 136 may provide received sets of instructions to transaction component 134 for execution. In some implementations, execution of individual ones of the instructions received may include invoking one or more function calls of an Application Programming Interface (API) 107. For example, API 107 may be configured to provide interactive communication between blockchain 117a and other components of system 100. For example, in some implementations, API 107 may support methods or functions that are implemented as function calls to smart contracts stored on blockchain 117a. For example, in some implementations, API 107 may support methods or functions that analyze or retrieve recorded information. For example, in some implementations, API 107 may support methods or functions that analyze a particular status of a particular user. In some implementations, receipt component 136 may be arranged, organized, and/or otherwise included in registry server 111 and/or blockchain 117a.

Transaction component 134 may be configured to record information, including but not limited to master hashes, e.g., on one or more permanent registries 117, such as blockchain 117a. In some implementations, transaction component 134 may record information on electronic storage 130b. In some implementations, transaction component 134 may record information on blockchain 117a. In some implementations, transaction component 134 may add, modify, analyze, and/or remove recorded information. For example, in accordance with received instructions from receipt component 136, transaction component 134 may recorded transactions on blockchain 117a. In some implementations, transaction component 134 may be arranged, organized, and/or otherwise included in blockchain 117a. In some implementations, transaction component 134 may be configured to access blockchain 117a to obtain information that is recorded on blockchain 117a, e.g., in one or more smart contracts.

Figure 4:
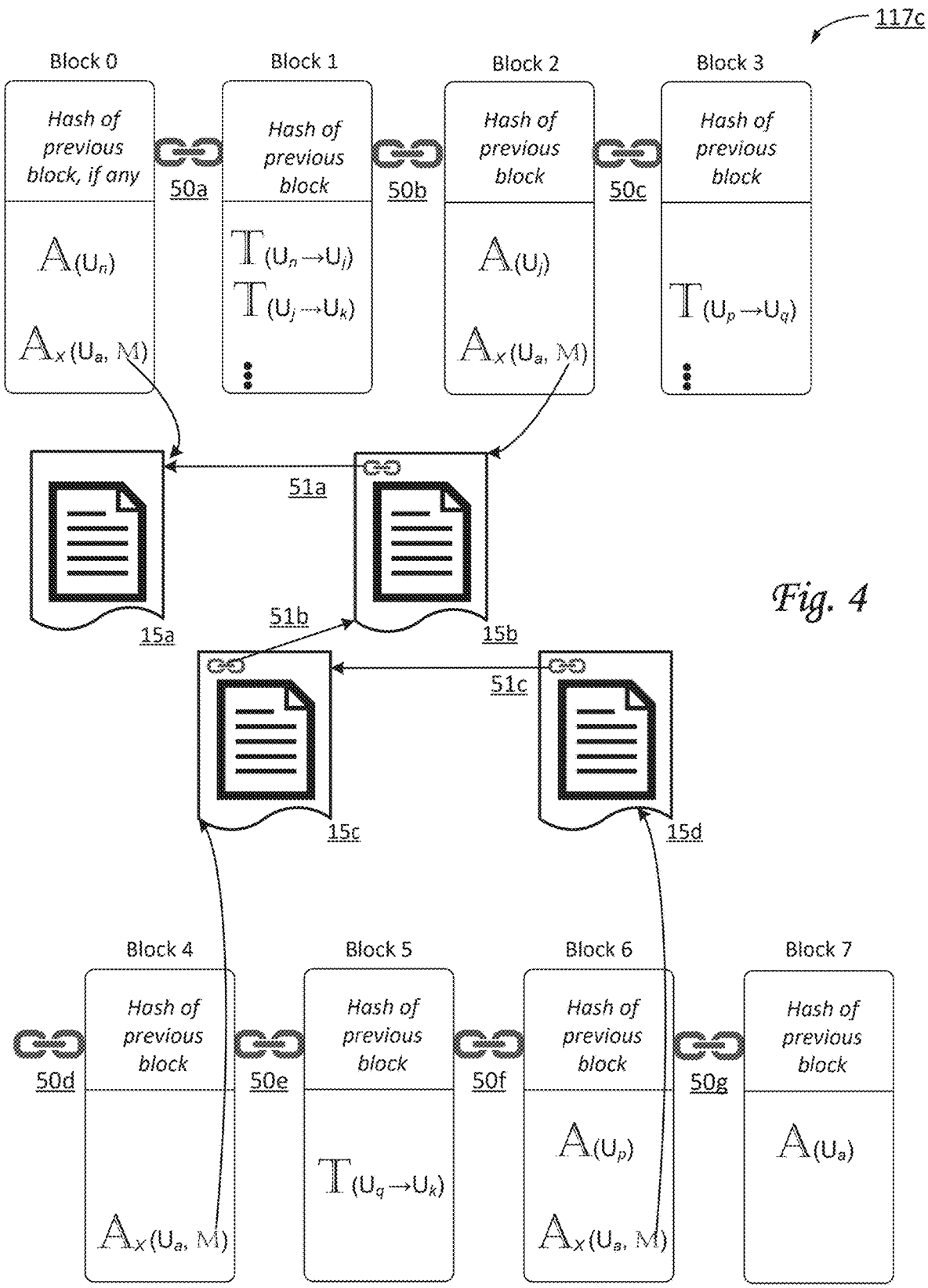
FIG. 4 illustrates an exemplary permanent registry, as may be used by a system configured to provide control of notification permissions, in accordance with one or more implementations.

FIG. 4 illustrates an exemplary blockchain 117c as may be used by system 100, in accordance with one or more implementations. Blockchain 117c as depicted includes a block 0, a block 1, a block 2, a block 3, a block 4, a block 5, a block 6, and a block 7. As time progresses, more blocks may be added to blockchain 117c. The blocks within blockchain 117c are ordered. In block 0, one article (indicated by a capital "A") is generated and/or assigned to user "n" ($U_n$). Another digital article (indicated by "Ax") is assigned to user "a" ($U_a$), which may be an administrative user. Asset "Ax" may include a multi-user set of information 15a (also referred to as master hash 15a) created by an encryption component similar to encryption component 110, on behalf of user "a". For example, master hash 15a may correspond to first master hash 32a of FIG. 3B (allowing organization "A" to notify user "X"). Assignments and other transactions in block 0 and other blocks may have been posted to blockchain 117c by a component similar to recording component 114.

Block 1 is connected to block 0 (as indicated by a link 50a), for example by including an address of block 0 in block 1, or vice versa. Likewise, block 2 is connected to block 1, as indicated by a link 50b, and so forth for the other depicted blocks and links 50c-50d-50e-50f-50g. In block 1, transactions from user "n" to user "j", and from user "j" to user "k" are recorded. In block 2, an asset is assigned to user "j" and another asset "Ax" (including a multi-user set of information 15b, or master hash 15b) is assigned to user "a" ($U_a$). For example, master hash 15b may correspond to second master hash 32b of FIG. 3B (allowing organization "B" to notify user "X"). Master hash 15b is linked to master hash 15a via a link 51a that is included in asset "Ax" of block 2 (similar to link 33a in FIG. 3B). In block 3, a transaction from user "p" to user "q" is recorded. In block 4, another asset "Ax" (including a multi-user set of information 15c, or master hash 15c) is assigned to user "a" ($U_a$). For example, master hash 15c may correspond to second master hash 32c of FIG. 3B (which may not include any events to user "X"). Master hash 15c is linked to master hash 15b via a link 51b that is included in asset "Ax" of block 4 (similar to link 33b in FIG. 3B). In block 5, a transaction from user "q" to user "k" is recorded. In block 6, an asset is assigned to user "p" and another asset "Ax" (including a multi-user set of information 15d, or master hash 15d) is assigned to user "a" ($U_a$). For example, master hash 15d may correspond to second master hash 32*d* of FIG. 3B (no longer allowing either organization "A" or organization "B" to notify user "X"). Master hash 15*d* is linked to master hash 15*c* via a link 51*c* that is included in asset "Ax" of block 6 (similar to link 33*c* in FIG. 3B). In block 7, an asset is assigned to user "a". The recorded master hashes on blockchain 117*c* form a sequence of linked master hashes that may be read and/or otherwise retrieved from blockchain 117*c* to verify whether a particular notification to a particular user at a particular point in time (e.g., at an audit point) was permitted. The reconstructed timeline for this particular user may connect the information in database 130*x* with the information recorded on blockchain 117*c*. The integrity of an individual master hash may be verified by a third party based on published information, as previously described.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between users.

Referring to FIG. 1, in some implementations, permission servers 105, server(s) 102, client computing platform(s) 104, registry servers 111, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which permission servers 105, server(s) 102, client computing platform(s) 104, registry servers 111, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, individual client computing platforms 104 may be configured to determine geolocation information for a current location of the individual client computing platforms 104. For example, an individual client computing platform 104 may include a geolocation sensor (e.g., a Global Positioning System or GPS device). The geolocation sensor may be configured to generate output signals conveying GPS information (e.g., a set or range of GPS coordinates) and/or other geolocation information, which may be used by the individual client computing platform 104 to determine the current location of the individual client computing platform 104.

External resources 138 may include sources of information outside of system 100, external entities participating with system 100 (including third parties such as external web-servers for different organizations), external providers of computation and/or storage services (e.g., a publicly accessible server external to system 100 that is used to post each set of event hashes that is used to produce and/or create a particular master hash), and/or other resources. In some implementations, external resources 138 may include one or more online service providers that plan to notify a particular set of users, e.g., on behalf of a particular set of organizations. In some implementations, some or all of the functionality attributed herein to external resources 138 may be provided by resources included in system 100. In some implementations, one or more external resources 138 may provide information (e.g., event information regarding events that are occurring and/or have occurred in the real world) to other components of system 100. In some implementations, external resources 138 may include one or more real-world information servers or blockchain oracles.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein. Electronic storage 130*a* may be similar to electronic storage 130 as described elsewhere in this disclosure, though included in registry servers 111, as depicted in FIG. 1.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 128, 134, and/or 136, and/or other components. Processor(s) 132 may be configured to execute components 108, 110, 112, 114, 116, 118, 120, 122, 124, 128, 134, and/or 136, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 128, 134, and/or 136 are illustrated in FIG. 1 as being implemented within a single processing unit, in implementations in which processor(s) 132 includes multiple processing units, one or more of components 108, 110, 112, 114, 116, 118, 120, 122, 124, 128, 134, and/or 136 may be implemented remotely from the other components. The description of the functionality provided by the different components 108, 110, 112, 114, 116, 118, 120, 122, 124, 128, 134, and/or 136 described below is for illustrative purposes only, and is not intended to be limiting, as any of components 108, 110, 112, 114, 116, 118, 120, 122, 124, 128, 134, and/or 136 may provide more or less functionality than is described. For example, one or more of components 108, 110, 112, 114, 116, 118, 120, 122, 124, 128, 134, and/or 136 may be eliminated, and some or all of its functionality may be provided by other ones of components 108, 110, 112, 114, 116, 118, 120, 122, 124, 128, 134, and/or 136. As another example, processor(s) 132 may be configured to execute one or more additional components that may perform some or all of the functionality attributed below to one of components 108, 110, 112, 114, 116, 118, 120, 122, 124, 128, 134, and/or 136.

System 100 supports multiple scenarios for usage. As a first sample scenario, assume a particular online service provider (which may be considered part of external resources 138) plans to notify a particular set of users on behalf of a particular set of organizations (or even one specific organization). The particular online service provider may transfer a particular instruction to system 100. The particular instruction may be received by verification component 112 and/or other components of system 100. Subsequently, system 100 may verify, for individual user identifiers in the particular instruction (i.e., in the particular set of users), whether the intended notification is permitted. Specific permission for the specific organization may be referred to as first-hand permission. In some cases, system 100 may simply respond "yes" or "no" to the particular online service provider. In some cases, system 100 may respond with a subset of the particular set of users for which the intended notification is permitted.

As a second sample scenario, assume a particular online service provider (which may be considered part of external resources 138) plans to notify a particular user on behalf of a particular organization. The particular online service provider may transfer a particular instruction to system 100. The particular instruction may be received by verification component 112 and/or other components of system 100. Subsequently, system 100 may verify, for an individual user identifier in the particular instruction (i.e., that identifies the particular user), whether the intended notification is permitted. In some cases, system 100 may reply pass or fail in real-time to the particular online service provider.

As a third sample scenario, assume a particular (communications) service provider (which may be considered part of external resources 138) receives an inbound phone call generated by a third party affiliate, regarding a particular user. This particular service provider may transfer a particular instruction to system 100. The particular instruction may be received by verification component 112 and/or other components of system 100. Subsequently, system 100 may verify, for an individual user identifier in the particular instruction (i.e., that identifies the particular user), whether the inbound phone call is permitted to be completed. In some cases, system 100 may either block or allow the inbound phone call in real-time to the particular service provider.

As a fourth sample scenario, assume a particular (online) service provider (which may be considered part of external resources 138) receives an inbound redirection for a website visitor, generated by a third party affiliate, to a prospective website. This particular service provider may transfer a particular instruction to system 100. The particular instruction may be received by verification component 112 and/or other components of system 100. Subsequently, system 100 may verify, for an individual user identifier in the particular instruction (i.e., that identifies the website visitor), whether the redirection of the website visitor is permitted to be completed (i.e., to present the prospective website). In some cases, system 100 may either block (i.e., do not present the prospective website to the website visitor) or allow (i.e., present the prospective website to the website visitor) the redirection.

As a fifth sample scenario, assume a particular (communications) service provider (which may be considered part of external resources 138) receives a set of inbound messages and/or phone calls from a particular sender, for a set of intended recipients. This particular service provider may transfer a particular instruction to system 100. The particular instruction may be received by verification component 112 and/or other components of system 100. Subsequently, system 100 may verify if the particular sender is permitted to contact the set of intended recipients. In some cases, system 100 may determine individual pass/fail responses in real-time to the particular service provider. Additionally, system 100 (or the particular service provider) may determine (or recommend) whether to permit messages and/or phone calls from this particular sender based on prior usage (e.g., based on the rate of passing previous messages and/or phone calls to failing previous messages and/or phone calls from this particular sender).

As a sixth sample scenario, assume a particular online service provider (which may be considered part of external resources 138) is interested in notifying an arbitrary set of users on behalf of one or more organizations. The particular online service provider may transfer a particular instruction to system 100. The particular instruction may be received by verification component 112 and/or other components of system 100. Subsequently, system 100 may verify, for individual user identifiers in the particular instruction (i.e., in the arbitrary set of users), whether a notification is permitted, or which notifications are permitted. In some cases, this verification may go back a predetermined time, such as 30 days, 60 days, 90 days, 120 days, or six months ago. This type of permission may be referred to as third-party permission. In some cases, the one or more organizations may have been unaware they had permission for at least some of the arbitrary set of users to notify them. In some cases, system 100 may simply respond "yes" or "no" to the particular online service provider. In some cases, system 100 may respond with a subset of the arbitrary set of users for which a notification on behalf of the one or more organizations is currently permitted.

As a seventh sample scenario, users may give individual computing devices (in particular Internet-of-Things or "IoT" devices) permission to access and/or otherwise use a particular device, service, and/or network. Such permissions may be referred to as usage permissions (using an identifier of the individual computing device rather than a user identifier, and an identifier of the particular device, service, and/or network rather than an organization identifier). For example, a particular user may give a personal computing device (or a particular smart appliance) permission to access a particular router. As another example, a particular user may give a particular laptop permission to communicate with a particular in-home thermostat. These types of permissions may be stored and used in a similar manner as notification permissions. At some point, a particular IoT device may request access and/or usage for a particular device, service, and/or network, at which time the current usage permissions are verified by system 100, and the request is either permitted or denied accordingly. In some implementations, an individual usage permission granted to a particular IoT device may cover a list or set of multiple devices, services, and/or local networks, e.g., if these are controlled by a single user.

Figure 2:
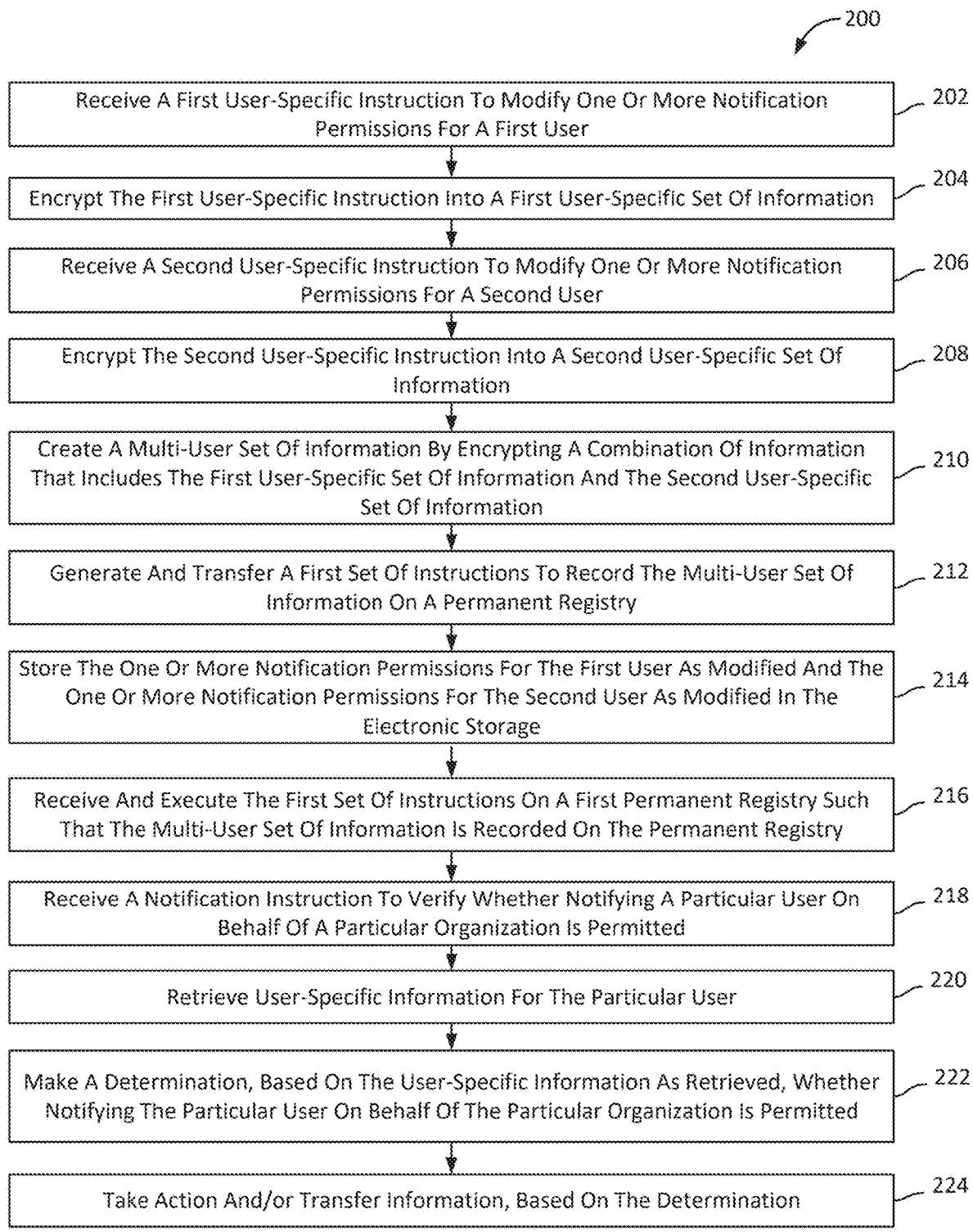
FIG. 2 illustrates a method of providing control of notification permissions, in accordance with one or more implementations.

FIG. 2 illustrates a method 200 of providing control of notification permissions, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a first user-specific instruction is received to modify one or more notification permissions for a first user. The first user-specific instruction includes (i) one or more user identifiers that identify the first user, including at least a first user identifier through which the first user can receive notifications, and (ii) a first set of organization identifiers that identify a first set of organizations for which the first user-specific instruction modifies the one or more notification permissions for the first user. In some embodiments, operation 202 is performed by a modification component the same as or similar to modification component 108 (shown in FIG. 1 and described herein).

At an operation 204, the first user-specific instruction is encrypted into a first user-specific set of information. In some embodiments, operation 204 is performed by an encryption component the same as or similar to encryption component 110 (shown in FIG. 1 and described herein).

At an operation 206, a second user-specific instruction is received to modify one or more notification permissions for a second user. The second user-specific instruction includes (i) one or more user identifiers that identify the second user, including at least a second user identifier through which the second user can receive notifications, and (ii) a second set of organization identifiers that identify a second set of organizations for which the second user-specific instruction modifies the one or more notification permissions for the second user. In some embodiments, operation 206 is performed by a modification component the same as or similar to modification component 108 (shown in FIG. 1 and described herein).

At an operation 208, the second user-specific instruction is encrypted into a second user-specific set of information. In some embodiments, operation 208 is performed by an encryption component the same as or similar to encryption component 110 (shown in FIG. 1 and described herein).

At an operation 210, a multi-user set of information is created by encrypting a combination of information that includes the first user-specific set of information and the second user-specific set of information. In some embodiments, operation 210 is performed by an encryption component the same as or similar to encryption component 110 (shown in FIG. 1 and described herein).

At an operation 212, a first set of instructions is generated and transferred to record the multi-user set of information on a permanent registry. In some embodiments, operation 212 is performed by a registry component the same as or similar to registry component 120 (shown in FIG. 1 and described herein).

At an operation 214, the one or more notification permissions are stored for the first user as modified and the one or more notification permissions for the second user as modified in the electronic storage. In some embodiments, operation 214 is performed by a storage component the same as or similar to storage component 122 (shown in FIG. 1 and described herein).

At an operation 216, the first set of instructions are received and executed on a first permanent registry such that the multi-user set of information is recorded on the permanent registry. In some embodiments, operation 216 is performed by a transaction component and/or a receipt component the same as or similar to transaction component 134 and/or receipt component 136 (shown in FIG. 1 and described herein).

At an operation 218, a notification instruction is received to verify whether notifying a particular user on behalf of a particular organization identified by a particular organization identifier is permitted. The particular organization identifier is included in both the first set of organization identifiers and the second set of organization identifiers. In some embodiments, operation 218 is performed by a verification component the same as or similar to verification component 112 (shown in FIG. 1 and described herein).

At an operation 220, user-specific information is retrieved for the particular user. In some embodiments, operation 220 is performed by a storage component the same as or similar to storage component 122 (shown in FIG. 1 and described herein).

At an operation 222, a determination is made, based on the user-specific information as retrieved, whether notifying the particular user on behalf of the particular organization is permitted. In some embodiments, operation 222 is performed by a permission component the same as or similar to permission component 116 (shown in FIG. 1 and described herein).

At an operation 224, based on the determination, action is taken and/or information is transferred. For example, the transferred information may be based on the determination by permission component 116. In some embodiments, operation 224 is performed by an action component the same as or similar to action component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to provide control of notification permissions by users, the system comprising:
    a permission server including:
    electronic storage configured to electronically store information; and
    one or more hardware processors configured by machine-readable instructions to:
    receive a first user-specific instruction to grant one or more notification permissions for a first user regarding the first user receiving notifications, wherein the first user-specific instruction includes
        (i) one or more user identifiers that identify the first user, including at least a first user identifier through which the first user has currently granted permission to receive the notifications, and
        (ii) a first set of organization identifiers that identify a first set of organizations for which the first user-specific instruction currently grants the one or more notification permissions regarding the first user, and wherein the first user identifier includes at least one of a first email address and/or a first phone number;
    encrypt the first user-specific instruction into a first user-specific set of information;
    create a multi-user set of information by creating a combination of information that includes the first user-specific set of information and then encrypting the combination;
    generate and transfer a first set of blockchain instructions to record the multi-user set of information on a blockchain;
    store, in the electronic storage, a timeline of modifications of the one or more notification permissions for the first user constructed in accordance with the first user-specific instruction;
    receive a second user-specific instruction to revoke the one or more notification permissions for the first user regarding the first user receiving notifications, wherein the second user-specific instruction includes
        (i) the one or more user identifiers that identify the first user, and
        (ii) the first set of organization identifiers for which the second user-specific instruction currently revokes the one or more notification permissions regarding the first user;
    update, in the electronic storage, the timeline of modifications of the one or more notification permissions for the first user in accordance with the second user-specific instruction;
    receive a first notification request to verify whether notifying the first user on behalf of a first organization identified by a first organization identifier is permitted, wherein the first organization identifier is included in the first set of organization identifiers;
    retrieve the timeline from the electronic storage;
    make a first determination, based on the timeline as retrieved, whether notifying the first user on behalf of the first organization is permitted; and
    responsive to determining that notifying the first user on behalf of the first organization is currently not permitted according to the timeline, respond to the first notification request that notifying the first user on behalf of the first organization is not permitted.

2. The system of claim 1, wherein the one or more hardware processors are further configured to:
    encrypt the second user-specific instruction into a second user-specific set of information;
    create a second multi-user set of information by creating a second combination of information that includes the second user-specific set of information and then encrypting the second combination; and
    generate and transfer a second set of blockchain instructions to record the second multi-user set of information on the blockchain.

3. The system of claim 1, wherein the first user identifier is an email address.

4. The system of claim 1, wherein the first user-specific instruction is received from an external web-server that hosts a website.

5. The system of claim 1, wherein different multi-user sets of information are created and recorded on the blockchain periodically, wherein subsequent ones of the different multi-user sets of information are recorded on the blockchain and linked together by one or more hash values.

6. The system of claim 1, wherein the user-specific information as received is used to construct the timeline of modifications of the one or more notification permissions for the first user.

7. The system of claim 1, wherein the user-specific information for the first user is retrieved from the electronic storage and includes the one or more notification permissions for the first user, and wherein the first determination reflects that notifying the first user on behalf of the first organization is currently not permitted.

8. A method of providing control of notification permissions by users, the method comprising:
    receiving a first user-specific instruction to grant one or more notification permissions for a first user regarding the first user receiving notifications, wherein the first user-specific instruction includes
        (i) one or more user identifiers that identify the first user, including at least a first user identifier through which the first user has currently granted permission to receive the notifications, and
        (ii) a first set of organization identifiers that identify a first set of organizations for which the first user-specific instruction currently grants the one or more notification permissions regarding the first user, and wherein the first user identifier includes at least one of a first email address and/or a first phone number;
    encrypting the first user-specific instruction into a first user-specific set of information;

creating a multi-user set of information by creating a combination of information that includes the first user-specific set of information and then encrypting the combination;

generating and transferring a first set of blockchain instructions to record the multi-user set of information on a blockchain;

storing, in electronic storage, a timeline of modifications of the one or more notification permissions for the first user constructed in accordance with the first user-specific instruction;

receiving a second user-specific instruction to revoke the one or more notification permissions for the first user regarding the first user receiving notifications, wherein the second user-specific instruction includes
  (i) the one or more user identifiers that identify the first user, and
  (ii) the first set of organization identifiers for which the second user-specific instruction currently revokes the one or more notification permissions regarding the first user;

updating, in the electronic storage, the timeline of modifications of the one or more notification permissions for the first user in accordance with the second user-specific instruction;

receiving a first notification request to verify whether notifying the first user on behalf of a first organization identified by a first organization identifier is permitted, wherein the first organization identifier is included in the first set of organization identifiers;

retrieving the timeline from the electronic storage;

making a first determination, based on the timeline as retrieved, whether notifying the first user on behalf of the first organization is permitted; and responsive to determining that notifying the first user on behalf of the first organization is currently not permitted according to the timeline, responding to the first notification request that notifying the first user on behalf of the first organization is not permitted.

9. The method of claim 8, further comprising:

encrypting the second user-specific instruction into a second user-specific set of information;

creating a second multi-user set of information by creating a second combination of information that includes the second user-specific set of information and then encrypting the second combination; and generating and transferring a second set of blockchain instructions to record the second multi-user set of information on the blockchain.

10. The method of claim 8, wherein the first user identifier is an email address.

11. The method of claim 8, wherein the first user-specific instruction is received from an external web-server that hosts a website.

12. The method of claim 8, wherein different multi-user sets of information are created and recorded on the blockchain periodically, wherein subsequent ones of the different multi-user sets of information are recorded on the blockchain and linked together by one or more hash values.

13. The method of claim 8, wherein the user-specific information as received is used to construct the timeline of modifications of the one or more notification permissions for the first user.

14. The method of claim 8, wherein the user-specific information for the first user is retrieved from the electronic storage and includes the one or more notification permissions for the first user, and wherein the first determination reflects that notifying the first user on behalf of the first organization is not permitted.

* * * * *